Dec. 19, 1950   J. J. DELANEY   2,534,420
METHOD AND APPARATUS FOR TESTING
NONMAGNETIC MATERIALS

Filed April 10, 1945   3 Sheets-Sheet 1

Inventor
John J. Delaney
By Lyon+Lyon
Attorneys

Inventor
John J. Delaney.
By Lyon & Lyon
Attorney

Dec. 19, 1950  J. J. DELANEY  2,534,420
METHOD AND APPARATUS FOR TESTING
NONMAGNETIC MATERIALS
Filed April 10, 1945  3 Sheets-Sheet 3
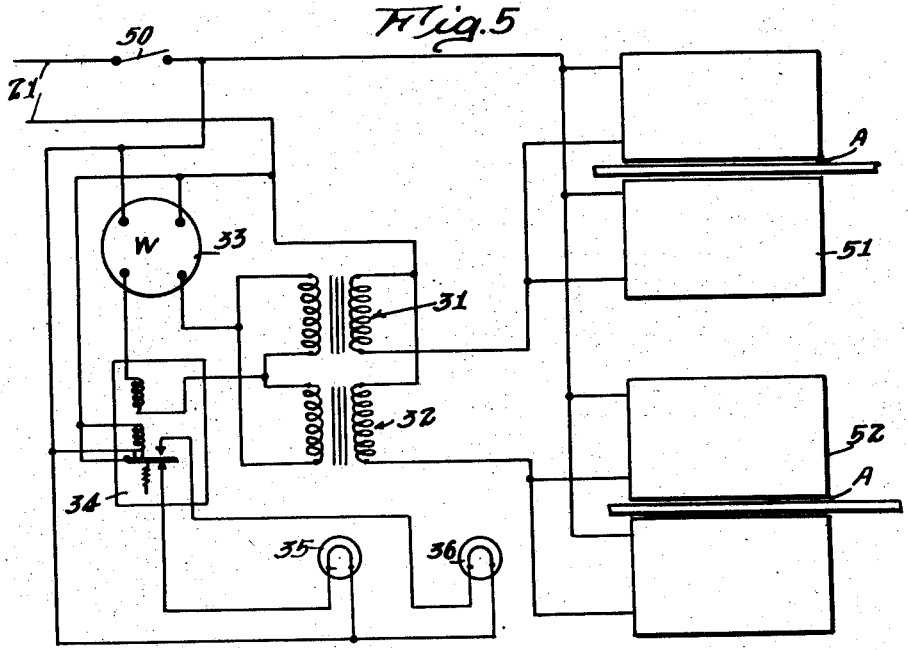
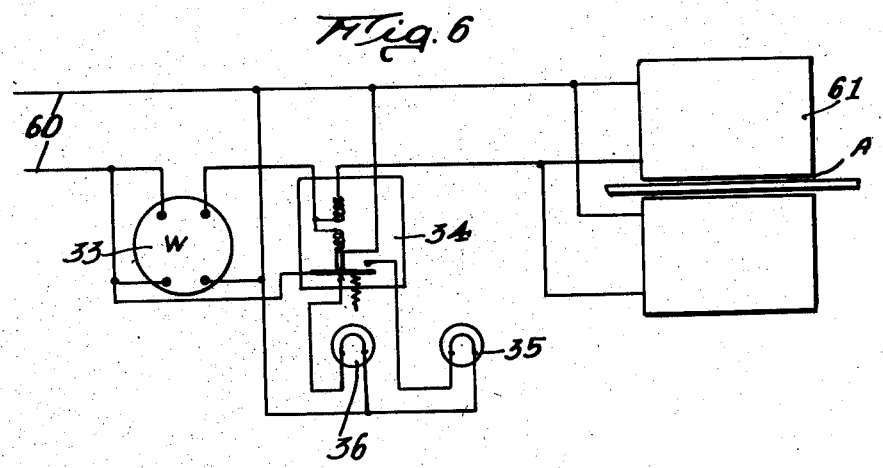
Inventor
John J. Delaney
By Lyon & Lyon
Attorneys Patented Dec. 19, 1950

2,534,420

UNITED STATES PATENT OFFICE 2,534,420

METHOD AND APPARATUS FOR TESTING NONMAGNETIC MATERIALS

John J. Delaney, Los Angeles, Calif., assignor of forty per cent to Francis Leroy Cook, San Diego, Calif.

Application April 10, 1945, Serial No. 587,479

3 Claims. (Cl. 175—183)

My invention relates to a method and apparatus for testing non-magnetic materials and more particularly to testing such materials as to their thickness, composition, properties, heat-treated condition, structure and presence of defects in the manufacture and processing of non-magnetic material, for example, sheet aluminum.

My invention is used for testing a limited area of the sheet or part to determine its electrical conductivity. Sheets of uniform thickness, composition, heat-treated condition, structure and those without defects have been found to have similar electrical conductivity. By the use of magnetic fluxes arranged to limit the area of the material in which the eddy currents are induced, the eddy currents can be measured and the electrical conductivity within the limited area of the material reported. I have found that soft aluminum allow, 24SO, for example, has a conductivity of 50 per cent of that of copper, whereas heat-treated aluminum alloy, 24ST, has a conductivity of 30 per cent of that of copper. By determining the conductivity, therefore, of the alloy, the success of the heat treating can thus be determined and if it is defective, the part eliminated. I further found the changes in electrical conductivity in many aluminum alloys follow very closely changes in tensile strength of the material. By connecting a watt-meter calibrated in electrical conductivity, the tensile strength of a sheet of aluminum can be determined. However, the thickness of the part must be known and a separate dial used for each thickness tested in my machine, since it is known that conductance of a part varies directly with its thickness. I, therefore, calibrate a watt-meter with a series of readings for the various thicknesses of material to be tested.

One of the main features of my invention is that by the use of my apparatus and method, any particular area of a sheet or casting can be tested regardless of the total area of the piece to be tested or the configuration of its perimeter. It can have holes in it, be flanged, have cut-outs, and these factors do not change the test results as long as these factors are outside of the area being tested.

In general my invention consists in a method and device for limiting the flow of eddy currents in non-magnetic materials to a limited area of the material by placing the material between two electrical magnets, each having an inner pole surrounded by an outer pole, and said poles being connected by a bridge or other means for causing the magnetic flux between the outer poles to vary directly with the flux between the inner poles. When the poles are so arranged and bridged an A. C. source applied to the electromagnets causes a magnetic flux to pass through the material in one direction between the inner poles and to return through the material between the outer poles in the opposite direction to the inner flux and to vary in intensity directly with the inner flux in such a manner that the flow of eddy currents in the material is practically limited to the area enclosed by the outer perimeter of the outer poles.

Another advantage of my invention is its simplicity as it has no moving parts.

Another advantage of my invention is that it is sufficiently accurate and sensitive to determine positively the differences between age hardened and non-age hardened aluminum alloys.

Another advantage is that the eddy current flow is limited to the specific areas bound by the outer perimeter of the outer poles of the magnets, thus measurements are confined to this area.

Another object and advantage of my invention is that my method and test unit can be used to test magnetically saturated magnetic materials in a similar manner.

Other objects and advantages of my invention will be apparent from the following description of the preferred embodiments thereof.

In the drawings:

Figures 4, 5 and 6 are schematic views of a modified circuit.

Figure 1:
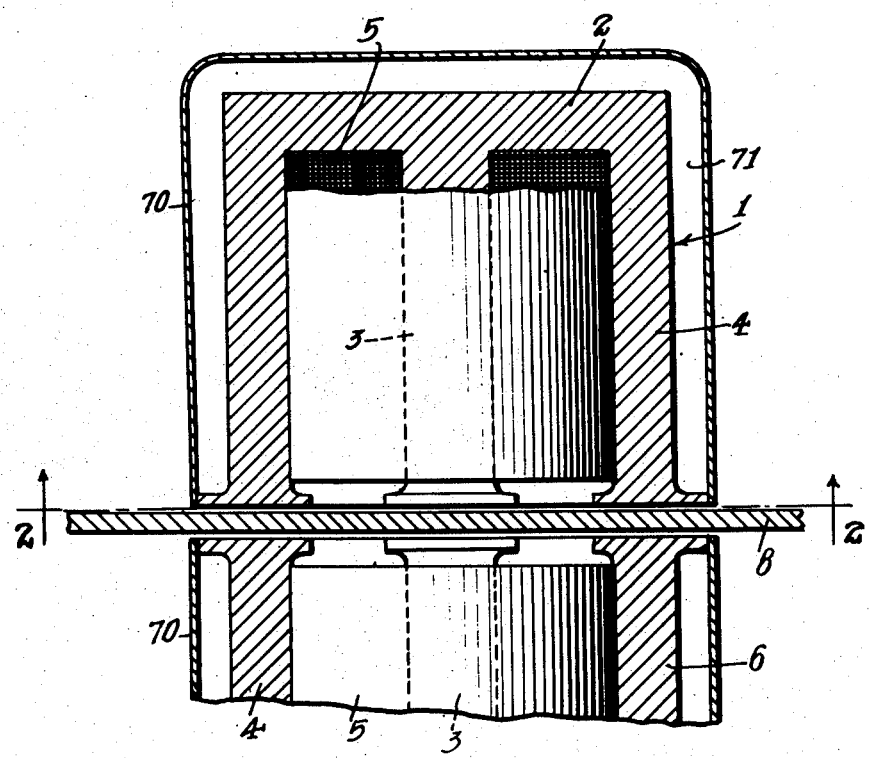
Figure 1 is a cross-section of the test unit through which the materials to be tested are passed.
Figure 2:
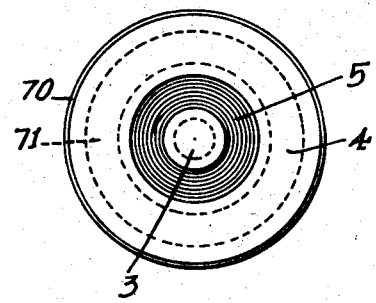
Figure 2 is a cross-section taken on the line 2—2 of Figure 1.

In Figure 1 is shown the preferred embodiment of the test unit through which the materials to be tested are passed. This unit can be connected to various circuits for determining electrical conductivity within the limited areas of the materials passed through this unit. These circuits will be more fully described hereinafter, but the test unit itself comprises an iron core 1 which preferably is constructed of thin laminations. The core 1 has a bridge 2 from which extend an inner pole 3 and a circular outer pole 4. These are spaced apart by a circular air gap 5. The core 1 is electrically wound to form the same into an electrical magnet by any suitable coil wound around either the bridge 2 or preferably the pole 3. An identically shaped core 6 is placed below the core 1 in a directly opposite position, and it is constructed identically with the upper magnet. An air gap is left between the two magnets to permit the passage of material therethrough. These two sets of magnets are hereafter referred to as the test unit. When an A. C. or varying current is passed into the coil of these electrical magnets, an electrical current will be induced in any material passed between them which is an electrical conductor. Any non-magnetic material placed in the air gap A will cause different amounts of power to be drawn by the coil of the magnets because of eddy currents set up in the material.

In Figure 1 there is shown between the two electrical magnets a sheet 8 of the material to be tested. When the magnets are energized, a magnetic flux flows from the circular pole 3 downwardly through the material 8 to be tested into the lower circular pole 3 through the lower bridge 2 back through the outer pole 4, again through the material 8 into the upper pole 4 through the bridge 2 to the original circular pole 3. By arranging this uniform construction, the only eddy electrical current induced in the material 8 is that within the outer bounds of the poles 4, thus limiting the specimen tested to that part which is directly between the two electrical magnets. Of course, as A. C. is used this flux flow is alternately reversed.

Regardless of the outside perimeter and shape of the material 8 to be tested, only that portion of the sample put in the air gap between the two magnets and limited to the area encircled by the outer perimeter of the outer pole 4 has its conductivity tested as the magnetic flux flowing through the inner and outer areas of the sample is equal, since the gaps are in series, making a magnetic circuit of the test units.

An additional aid, but not necessary to the operation of my test unit, is the shield 70 which is made of steel, iron or other magnetic material. The shield completely envelops the electromagnets and extends down to and is magnetically connected with the outer perimeter of the pole 4. Air space 71 separates shield 70 from core 1. Any eddy currents established by the electromagnets will be within the area surrounded by the perimeter of the pole 4, and any slight losses into the tested material outside the perimeter of the pole 4 will be prevented.

Figure 3:
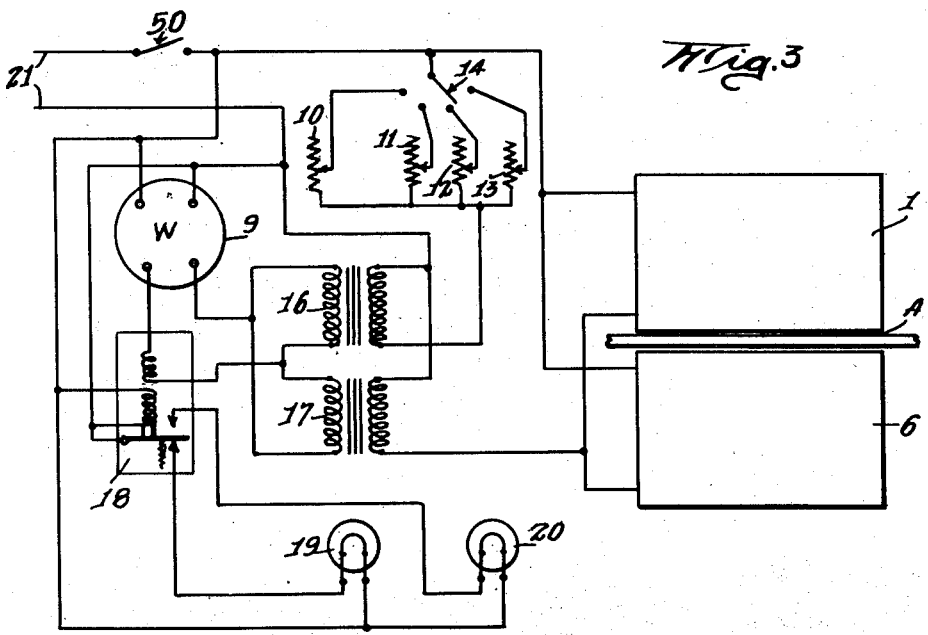
Figure 3 is a schematic view of my testing apparatus with the test unit through which the material to be tested is passed, shown in perspective.

In the circuit shown in Figure 3, the numeral 21 represents an A. C. power supply with a shut-off switch 50 which feeds into the primaries of the current transformers 16 and 17 and returns from the primary of transformer 16 and through any of the variable resistors 10, 11, 12 or 13. I provide a selector switch 14 to select the proper resistors 10, 11, 12 or 13. The current entering the primary of transformer 17 returns through the coils of the electromagnets of the test unit. The watt-meter 9 is actuated by the differential current of the secondaries of the transformers 16 and 17 and the direct A. C. line voltage. When the power supply 21 is constant voltage, the power differential between the test unit and the selected resistors 10, 11, 12 or 13 will give an indication on the watt-meter 9 which indicates the amount by which the electrical conductivity within a limited area of a sample placed in the air gap A between the electromagnets of the test unit differs from the desired value. A power relay 18 is actuated in the same manner as the watt-meter 9 and adjusted to light the lamp 19 whenever the sample is of correct electrical conductivity and to light the lamp 20 whenever the electrical conductivity of the sample differs by a fixed amount. When the voltage of the power source 21 is variable, a zero reading on the watt-meter 9 will indicate the unknown sample to be of the desired conductivity and the zero power supplied to power relay 18 will cause it to light lamp 19. The resistors 10, 11, 12 and 13 are of a proper value to give a zero reading when material having the desired conductivity is placed in the air gap A.

Figure 4:
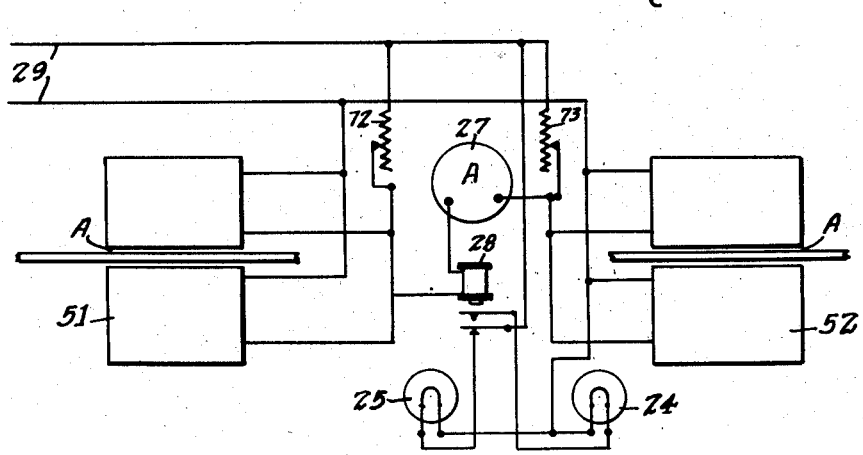

Another method of using my testing unit is shown in Figure 4 in which two test units 51 and 52 are placed as two legs of an A. C. bridge arrangement supplied by the A. C. power supply 29 with a milliammeter 27 and a current relay 28 connected in series in the detector circuit of the bridge. To adjust the balance I provide the variable resistance 72 and 73. A standard sample is placed in the air gap A of the test unit 51 and an unknown sample is placed in the air gap A of test unit 52. When the limited areas of both samples have a similar conductivity the milliammeter 27 reads zero, but dissimilar samples will unbalance the bridge causing a current to flow through the milliammeter 27. Relay 28 is adapted to operate when a current flows through the bridge detector circuit to light the lamp 24 to warn the operator to reject the sample. When the bridge circuit is in balance the operator knows that the sample in test unit 52 complies with the required specifications, and as the relay 28 is drawing no current the lamp 25 is lit to indicate that the sample is of the required specifications.

In Figure 5 is shown a combination of the circuits described in Figures 3 and 4. In this circuit two test units 51 and 52 are used, and in the air gaps A are placed known and unknown samples. The numeral 21 is an A. C. power supply with shut-off switch 50. In series with the primaries of the current transformers 31 and 32 are placed the electromagnets of the test units 51 and 52 respectively. The differential current of the secondaries of the current transformers 31 and 32 feeds the current coil of the watt-meter 33 and the current coil of a power relay 34. The A. C. line voltage excites the voltage coils of watt-meter 33 and power relay 34. The differential in power drawn through the primaries of current transformers 31 and 32 causes a variation in the secondaries recorded by the watt-meter 33. Similarly, when the variations become large the relay 34 warns the operator by extinguishing the lamp 35 and lighting the lamp 36. For a constant voltage source the exact differential in conductivities within the limited volumes of the samples can be read on the watt-meter 33 or used to actuate the power of relay 34.

In Figure 6 is shown a test unit supplied by a constant voltage A. C. source 60, the power drawn by the test unit 61 being drawn through the watt-meter 33 and the power relay 34. The sample to be tested is placed in the air gap A and the power drawn when a specific sample is in the air gap is measured by the watt-meter 33 and actuates the power relay 34, lighting the lamp 35 when the power drawn by the sample is not as desired and lighting lamp 36 when the power drawn by the sample is as desired.

While I have described the preferred forms of my invention, I am not limited to any of the

I claim:

1. In an apparatus for testing non-magnetic materials, two pairs of complementary electromagnets, each pair having open poles facing each other and separated to admit samples in the gap between them, said electromagnets having a bridge with a central pole extending therefrom and an outer pole extending from said bridge and surrounding said central pole, all of said poles and bridges of all the electromagnets having substantially the same size and shape, a source of A. C. current to excite both pairs of electromagnets, the primary of a transformer in series with each pair of electromagnets, a watt-meter actuated by the differential current of the secondaries of said transformers and the A. C. line voltage, whereby known and unknown samples can be placed between the pairs of electromagnets and said watt-meter will record their similarity or dissimilarity.

2. In an apparatus for testing non-magnetic materials, two pairs of complementary electromagnets, each pair having open poles facing each other and separated to admit samples in the gap between them, said electromagnets having a bridge with a central pole extending therefrom and an outer pole extending from said bridge and surrounding said central pole, all of said poles and bridges of all the electromagnets having substantially the same size and shape, a source of A. C. current to excite both pairs of electromagnets, the primary of a transformer in series with each pair of electromagnets, said transformer having two identical secondaries, a power relay actuated by the differential current of said secondaries and a pair of signal lights connected to said source of A. C. current by the contacts of said relay whereby one of said lights is energized by said relay when there is no current differential in said secondaries and the other of said lights is energized when there is a current differential in said secondaries.

3. In an apparatus for testing non-magnetic materials, two pairs of complementary electromagnets, each pair having open poles facing each other and separated to admit samples in the gap between them, said electromagnets having a bridge with a central pole extending therefrom and an outer pole extending from said bridge and surrounding said central pole, all of said poles and bridges of all the electromagnets having substantially the same size and shape, a constant voltage source of A. C. current to excite both pairs of electromagnets, the primary of a transformer in series with each pair of electromagnets, a wattmeter connected to the secondaries of said transformers and to said source of A. C. current and actuated by the differential current of the secondaries of said transformers and the constant A. C. line voltage, whereby known and unknown samples can be placed between the pairs of electromagnets and said wattmeter will accurately indicate the difference between the conductivities of the two samples.

JOHN J. DELANEY.

REFERENCES CITED

The following references are of record in the file of this patent:

UNITED STATES PATENTS

| Number | Name | Date |
|---|---|---|
| 1,869,336 | De Forest | July 26, 1932 |
| 1,969,536 | Winne | Aug. 7, 1934 |
| 2,020,067 | Keinath | Nov. 5, 1935 |
| 2,111,210 | Ebel | Mar. 15, 1938 |
| 2,269,152 | Hathaway | Jan. 6, 1942 |

FOREIGN PATENTS

| Number | Country | Date |
|---|---|---|
| 368,006 | Great Britain | Mar. 3, 1932 |

OTHER REFERENCES

Journal of Applied Mechanics (Trans. A. S. M. E.), March 1941, vol. 8, No. 1, pages A-22 to A-26, inc.

Journal of Applied Physics, vol. 13, June 1942, pages 377-383.